(12) United States Patent
Wu

(10) Patent No.: US 8,693,196 B2
(45) Date of Patent: Apr. 8, 2014

(54) HOST APPARATUS WITH WATERPROOF FUNCTION AND HEAT DISSIPATION MODULE THEREOF

(75) Inventor: Chi-Jung Wu, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 248 days.

(21) Appl. No.: 13/216,119

(22) Filed: Aug. 23, 2011

(65) Prior Publication Data

US 2012/0057296 A1    Mar. 8, 2012

(30) Foreign Application Priority Data

Sep. 8, 2010 (CN) .......................... 2010 1 0275680

(51) Int. Cl.
*H05K 7/20* (2006.01)
*G06F 1/20* (2006.01)
*F28F 13/00* (2006.01)

(52) U.S. Cl.
USPC . 361/698; 361/704; 361/679.47; 361/679.48; 361/679.52; 361/679.54

(58) Field of Classification Search
USPC ............. 361/679.47, 679.48, 679.52, 679.54, 361/698, 704; 165/121
See application file for complete search history.

(56) References Cited

U.S. PATENT DOCUMENTS

| | | | | |
|---|---|---|---|---|
| 5,808,869 A | * | 9/1998 | Donahoe et al. | 361/704 |
| 5,862,037 A | * | 1/1999 | Behl | 361/679.49 |
| 5,898,568 A | * | 4/1999 | Cheng | 361/695 |
| 6,034,871 A | * | 3/2000 | Cheng | 361/695 |
| 6,058,009 A | * | 5/2000 | Hood et al. | 361/679.47 |
| 6,104,607 A | * | 8/2000 | Behl | 361/679.49 |
| 6,141,214 A | * | 10/2000 | Ahn | 361/679.48 |
| 6,188,573 B1 | * | 2/2001 | Urita | 361/679.48 |
| 6,459,575 B1 | * | 10/2002 | Esterberg | 361/679.47 |
| 6,563,703 B2 | * | 5/2003 | Xie | 361/679.33 |
| 6,571,340 B1 | * | 5/2003 | Lee | 713/300 |
| 6,657,121 B2 | * | 12/2003 | Garner | 174/16.3 |
| 6,657,859 B1 | * | 12/2003 | Karr | 361/679.33 |
| 6,724,626 B1 | * | 4/2004 | Hodes et al. | 361/700 |
| 6,796,372 B2 | * | 9/2004 | Bear | 165/104.21 |
| 6,836,407 B2 | * | 12/2004 | Faneuf et al. | 361/679.49 |
| 6,914,782 B2 | * | 7/2005 | Ku | 361/700 |
| 7,012,807 B2 | * | 3/2006 | Chu et al. | 361/699 |
| 7,126,818 B2 | * | 10/2006 | Lu et al. | 361/695 |

(Continued)

FOREIGN PATENT DOCUMENTS

| | | |
|---|---|---|
| CN | 101351103 A | 1/2009 |
| CN | 101719008 A | 6/2010 |
| TW | M318896 | 9/2007 |

*Primary Examiner* — Anatoly Vortman

(57) ABSTRACT

A heat dissipation module suitable for a host apparatus is provided. The heat dissipation module has a shell body. The shell body has a heat conductive side and an air outlet-inlet side. The air outlet-inlet side has an air outlet and an air inlet. A contact sink having a fixing portion and a contact portion is installed on the heat conductive side such that the contact portion contacts a position requiring heat dissipation in the host apparatus. A heat conductive tube is disposed in the shell body between the fixing portion of the contact sink and the air outlet. A heat dissipation fin is disposed on the air outlet. A waterproof fan is installed on the air outlet. The shell body and the contact sink define an enclosure having waterproof edges except for openings on the air outlet-inlet side.

9 Claims, 4 Drawing Sheets

(56) References Cited

U.S. PATENT DOCUMENTS

| | | | |
|---|---|---|---|
| 7,321,491 B2* | 1/2008 | Long et al. | 361/679.48 |
| 7,532,470 B2* | 5/2009 | Ariga | 361/695 |
| 7,911,781 B2* | 3/2011 | Chao et al. | 361/679.48 |
| 7,948,750 B2* | 5/2011 | Hung et al. | 361/679.47 |
| 7,948,754 B2* | 5/2011 | Huang | 361/692 |
| 8,000,099 B2* | 8/2011 | Parker | 361/679.48 |
| 8,009,418 B2* | 8/2011 | Hosokawa | 361/679.52 |
| 8,164,901 B2* | 4/2012 | Neudorfer | 361/699 |
| 8,320,121 B2* | 11/2012 | Bisson et al. | 361/679.51 |
| 2002/0105783 A1* | 8/2002 | Kitahara | 361/695 |
| 2005/0225942 A1* | 10/2005 | Lee | 361/700 |
| 2006/0082966 A1* | 4/2006 | Lev et al. | 361/687 |
| 2009/0244843 A1* | 10/2009 | Hirohata et al. | 361/696 |
| 2010/0238628 A1* | 9/2010 | Hung et al. | 361/697 |
| 2011/0157824 A1* | 6/2011 | Fujiwara | 361/695 |

\* cited by examiner

HOST APPARATUS WITH WATERPROOF FUNCTION AND HEAT DISSIPATION MODULE THEREOF

FIELD OF THE INVENTION

The present invention relates to heat dissipation modules, and more particularly to a heat dissipation module applicable in a host apparatus of an industrial notebook computer.

BACKGROUND OF THE INVENTION

Currently, industrial notebook computer devices are mostly the sealed shell body type, because the products themselves need to take the requirements of dropping and waterproofing into consideration. Therefore, the interior of the system of the industrial notebook computer needs a design which does not have a waterproof fan. As a result, the heat dissipation efficiency of the system is greatly limited and the processing efficiency of the system is also reduced.

In order to promote efficiency of the systems, in some designs, a plug-in waterproof fan assembly is added to the shell body of the industrial notebook computer, which will benefit heat dissipation of the system. However, the waterproof fan assembly is inconvenient to install in such designs, and the appearance of the entire system is unwieldy. Furthermore, traditional connecting methods may sacrifice a functional part of the notebook computer, such as a CD-ROM device.

SUMMARY OF THE INVENTION

Therefore, it is an objective of the present invention to provide a heat dissipation module, wherein the heat dissipation module is applicable in an industrial host apparatus, so as to release heat generated by the system of the host apparatus.

It is another objective of the present invention to provide a host apparatus with waterproof function which has a high heat dissipation efficiency.

To achieve the above-mentioned advantages, the present invention provides a heat dissipation module suitable for a host apparatus. The heat dissipation module includes a shell body, a contact sink, a heat conductive tube and a heat dissipation fin.

The present invention also provides a host apparatus with waterproof function. The host apparatus includes a host shell body, a host board, a first contact sink, and a heat dissipation module. In addition, the heat dissipation module includes a shell body, a second contact sink, a heat conductive tube, a heat dissipation fin, and a waterproof fan.

Since the heat dissipation module provided by the present invention is removably assembled in the host apparatus, it is simple to assemble the heat dissipation module. Additionally, the contact sink and the heat conductive tube installed in the heat dissipation module can help the system of the host apparatus to deliver efficient and uniform heat dissipation.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or limiting to the precise form disclosed.

Figure 1A:
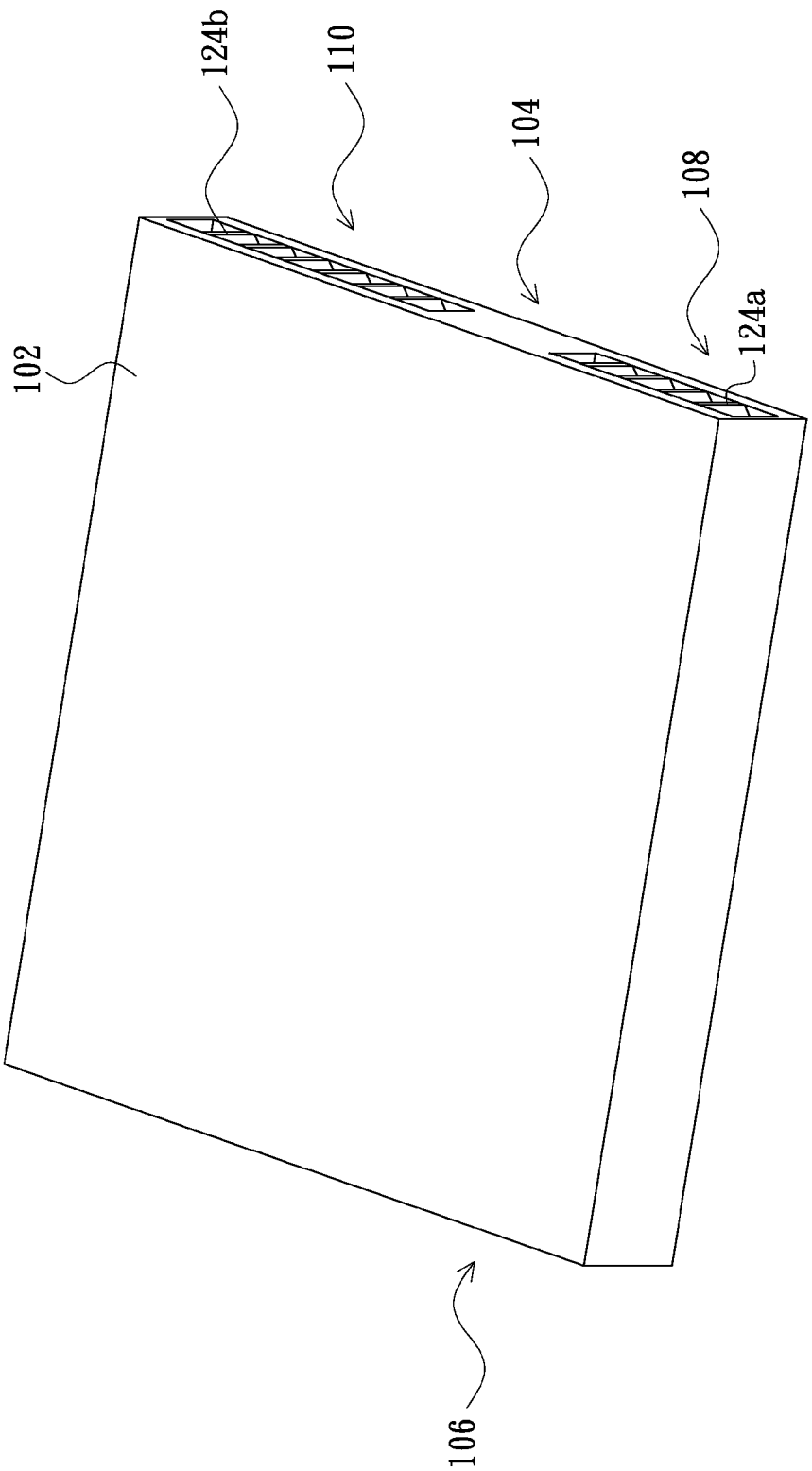
FIG. 1A is an external view of a heat dissipation module of a preferred embodiment of the present invention.

FIG. 1A is an external view of a heat dissipation module of a preferred embodiment of the present invention. Referring to FIG. 1A, a heat dissipation module 100 of the present embodiment includes a shell body 102. The shell body 102 has an air outlet-inlet side 104 and a heat conductive side 106, wherein the air outlet-inlet side 104 has an air inlet 108 and an air outlet 110. In the present embodiment, edges (except the air outlet-inlet side 104) of the shell body 102 of the heat dissipation module 100 are waterproof, and the thus shell body 102 is almost sealed.

In addition, a heat dissipation fin is disposed on at least one of the air inlet 108 and the air outlet 110. In the present embodiment, heat dissipation fins 124a, 124b are respectively disposed on the air inlet 108 and the air outlet 110, but the application is not limited to this particular arrangement.

Figure 1B:
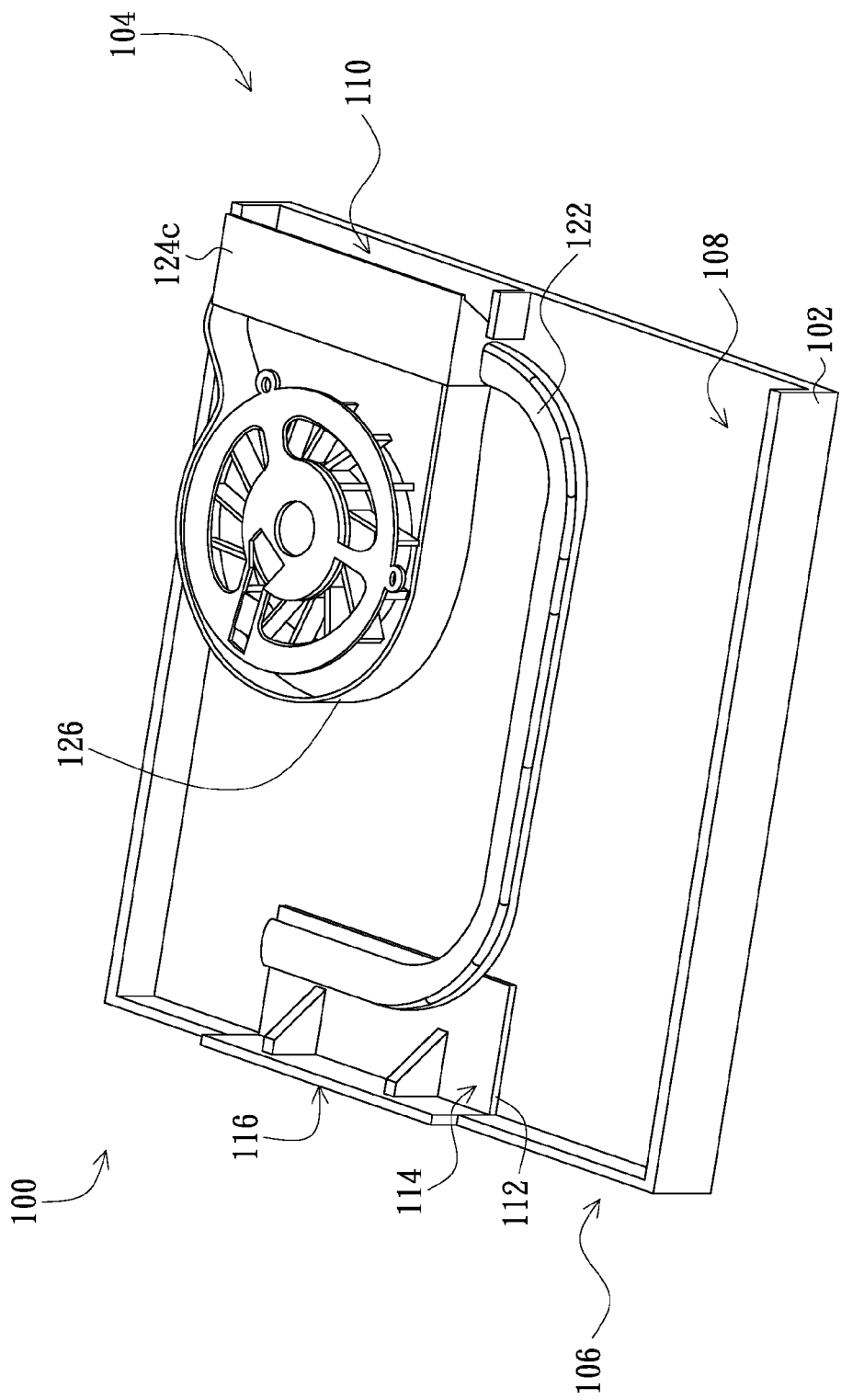
FIG. 1B is an internal view of a heat dissipation module of a preferred embodiment of the present invention.

FIG. 1B is an internal view of a heat dissipation module of a preferred embodiment of the present invention. Referring to FIG. 1B, a contact sink 112 of the heat dissipation module 100 is installed on the heat conductive side 106. The contact sink 112 has a fixing portion 114 and a contact portion 116. In the present embodiment, the fixing portion 114 and the contact portion 116 are substantially perpendicular to each other, so that a cross-section of the contact sink 112 is L-shaped. The fixing portion 114 is fixed to the bottom of the shell body 102. Additionally, the heat conductive side 106 has a gap exposing the contact portion 106. In the present embodiment, a length of the contact portion 116 is substantially the same as that of the gap of the heat conductive side 106, so that an edge of the contact portion 106 tightly fits an edge of the gap of the heat conductive side 106. In some embodiments, a material of the contact sink 112 is metal.

The heat dissipation module 100 further includes a heat conductive tube 122, a plate heat dissipation fin 124c and a waterproof fan 126 disposed in the shell body 102. The plate heat dissipation fin 124c and a waterproof fan 126 are installed on the air outlet 110. Furthermore, one end of the heat conductive tube 122 is fixed on the fixing portion 114 of the contact sink 112, and the end of the heat conductive tube 122 is connected to the plate heat dissipation fin 124c. In addition, in some embodiments, the waterproof fan 126 can be, but is not limited to, a side entering waterproof fan. The waterproof fan 126 can also be a centrifugal fan or an axial flow fan having a suitable size.

Figure 2:
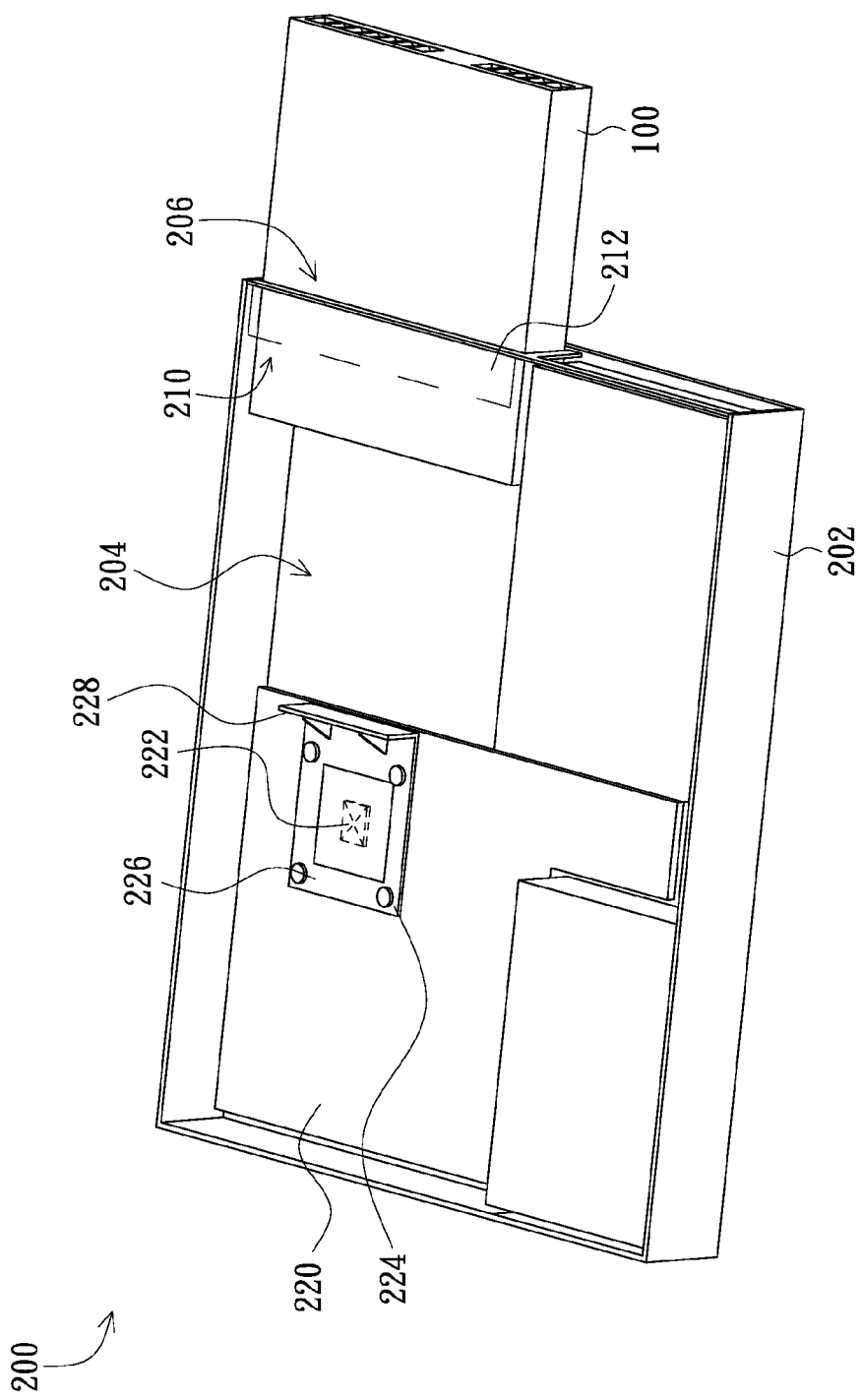
FIG. 2 is an internal view of a host apparatus with waterproof function of a preferred embodiment of the present invention.

FIG. 2 is an internal view of a host apparatus with waterproof function of a preferred embodiment of the present invention. Referring to FIG. 2, a host apparatus 200 provided by the present embodiment has a host shell body 202. The host shell body 202 is a sealed structure, thereby the host apparatus 200 has a waterproof function. In the present embodiment, the host apparatus 200 is, for example, a portable computer device.

There is a slot 204 disposed in the host shell body 202 of the host apparatus 200. The slot 204 has an opening 206 disposed on a side of the host shell body 202. In some embodiments, the slot 204 is a slot for a removable drive, or a slot for a spare battery. Preferably, a size of the heat dissipation module 100 is substantially the same as that of the slot 204. Therefore, after the removable drive or the spare battery is removed from the slot 204, the heat dissipation module 100 can be inserted into the slot 204. Correspondingly, when the operation of the host apparatus 200 requires the removable drive or the spare battery, the heat dissipation module 100 is removed so that the slot 204 can accommodate the removable drive or the spare battery.

Furthermore, the edges of the shell body 102 of the heat dissipation module 100 are waterproof, and the heat dissipation module 100 fits in the slot 204. Therefore, when the heat dissipation module 100 is inserted into the host apparatus 200, even if water enters into the heat dissipation module 100, water can not enter into other portions of the host apparatus 200.

Moreover, in some embodiments, a cover mechanism 210 which has a cover 212 is provided on the opening 206 of the host shell body 202 of the host apparatus 200. When an object has not been inserted into the slot 204, the cover 212 completely covers the opening 206. Thus, when the host apparatus 200 is used with nothing in the slot 204, water is prevented from entering the empty slot 204.

A host board 220 is installed in the host shell body 202 of the host apparatus 200. The host board 220 has a plurality of elements. Among the elements of the host apparatus 200, at least one element 222 generates high heat when operating. The element 222 may be, for example, a central processing unit (CPU), north-bridge and south-bridge chips, and a graphic processing chip and so on. In order to dissipate the high heat generated by the element 222, a contact sink 224 is installed on the element 222.

Similar to the contact sink 112, the contact sink 224 also has a fixing portion 226 and a contact portion 228. Similarly, the fixing portion 226 and the contact portion 228 are substantially perpendicular to each other, wherein the fixing portion 226 tightly abuts the element 222. In some embodiments, the fixing portion 226 is directly manufactured on the element 222. For example, the fixing portion 226 may be welded on the element 222, or the element 222 may be integrated with the fixing portion 226. In addition, a material of the contact sink 224 may be metal. Therefore, when the element 222 operates, the high heat generated by the element 222 is conducted from the fixing portion 226 to the contact portion 228.

Figure 3:
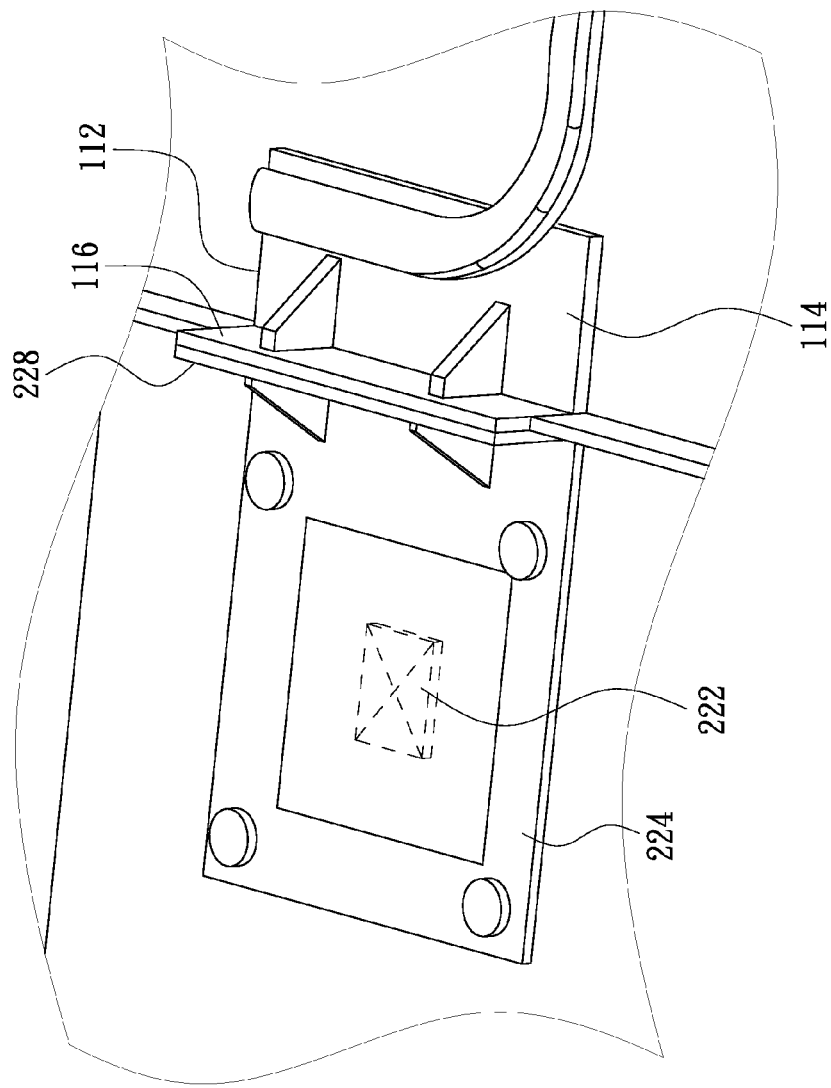
FIG. 3 is a schematic view of contact portions of a heat dissipation module and a host apparatus of an embodiment of the present invention.

FIG. 3 is a schematic view of contact portions of a heat dissipation module and a host apparatus of an embodiment of the present invention. Referring to FIG. 1 and FIG. 3 together, the contact portion 228 of the contact sink 224 contacts the contact portion 116 of the contact sink 112. In use, heat energy conducted from the contact sink 224 to the contact portion 228 is conducted to the contact portion 116 of the contact sink 112, and then the heat energy is conducted to the fixing portion 114. The heat energy is also conducted from the contact sink 112 to the plate heat dissipation fin 124c along the conductive tube 122. In addition, the waterproof fan 126 continuously pumps the outside air into the shell body 102 via the air inlet 108. In addition, the waterproof fan 126 exhausts air, which passes through the plate heat dissipation fin 124c out of the shell body 102 via the air outlet 110. Therefore, the heat energy of the plate heat dissipation fin 124c can be dissipated. In such way, when the element 222 operates, the heat energy generated by the element 222 can be exhausted out of the host apparatus 200.

In summary, in the present invention, the heat dissipation module 100 fits in the slot 204, and the shell body 102 of the heat dissipation module 100 is almost sealed. Therefore, the present invention can meet the requirements of heat dissipation and waterproofing. Furthermore, since the heat dissipation module 100 is removably inserted into the slot for receiving a removable drive or a spare battery, a space in the host shell body 202 of the host apparatus 200 is not wasted, and the assembly process is simplified.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A heat dissipation module, suitable for a host apparatus, comprising:
   a shell body, having a heat conductive side and an air outlet-inlet side, wherein air outlet-inlet side comprises an air inlet and an air outlet;
   a contact sink comprising a fixing portion and a contact portion, installed on the heat conductive side such that the contact portion contacts a position requiring heat dissipation in the host apparatus;
   a heat conductive tube, disposed in the shell body, wherein a first end of said heat conductive tube is fixed on the fixing portion of the contact sink, and a second end of the heat conductive tube is disposed on the air outlet;
   a heat dissipation fin, disposed on the air outlet, connecting to the second end of the heat conductive tube; and
   a waterproof fan, installed on the air outlet, configured for exhausting air out of the shell body via the air outlet, wherein the shell body and the contact sink define an enclosure having waterproof edges except for openings on the air outlet-inlet side.

2. The heat dissipation module according to claim 1, wherein a material of the contact sink is metal.

3. The heat dissipation module according to claim 1, wherein a cross-section of the contact sink is L-shaped.

4. The heat dissipation module according to claim 1, wherein the waterproof fan is a side entering waterproof fan, a centrifugal fan or an axial flow fan.

5. A host apparatus with waterproof function comprising:
   a host shell body, having a slot, wherein said slot has an opening defined on a side of the host shell body;
   a host board, installed in the host shell body, having at least one element generating heat when operating;
   a first contact sink, having a first fixing portion and a first contact portion, wherein said first fixing portion tightly abuts the element generating high heat; and
   a heat dissipation module, removably inserted into the slot, comprising:
      a heat dissipation module shell body, having a heat conductive side and an air outlet-inlet side, wherein said air outlet-inlet side comprises an air inlet and an air outlet, wherein the shell body defines an enclosure having openings on only the air outlet-inlet side, and said heat dissipation module is configured to be receivable in the slot such that the air outlet-inlet side is disposed in the opening and said heat conductive side is disposed in a position corresponding to the first contact sink;

a second contact sink comprising a second fixing portion and a second contact portion, installed on the heat conductive side such that said second fixing portion is fixed on the heat dissipation module shell body and said second contact portion contacts the first contact portion;

a heat conductive tube, disposed in the shell body, wherein a first end of said heat conductive tube is fixed on the second fixing portion of the contact sink, and a second end of the heat conductive tube is disposed on the air outlet;

a heat dissipation fin, disposed on the air outlet, connecting to one end of the heat conductive tube; and a waterproof fan, installed on the air outlet, configured for exhausting air out of the heat dissipation module shell body via the air outlet, wherein the heat dissipation module shell body and the second contact sink define an enclosure having waterproof edges except for openings on the air outlet-inlet side.

6. The host apparatus according to claim 5, wherein said first fixing portion and said first contact portion are substantially perpendicular to each other.

7. The host apparatus according to claim 5, wherein a material of the first contact sink is metal.

8. The host apparatus according to claim 5, wherein said second fixing portion and said second contact portion are substantially perpendicular to each other.

9. The host apparatus according to claim 5, wherein the waterproof fan is a side entering waterproof fan, a centrifugal fan or an axial flow fan.

* * * * *